Sept. 1, 1970    J. P. SHURCLIFF    3,526,463
MARKING INSTRUMENT
Filed Jan. 16, 1969    2 Sheets-Sheet 2
FIG. 11.
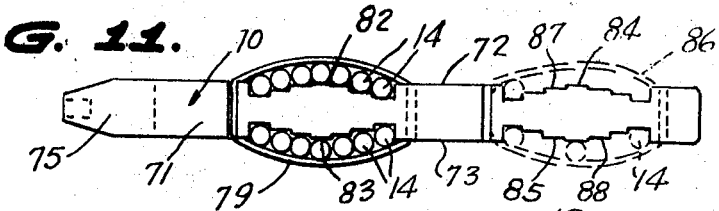
FIG. 12.
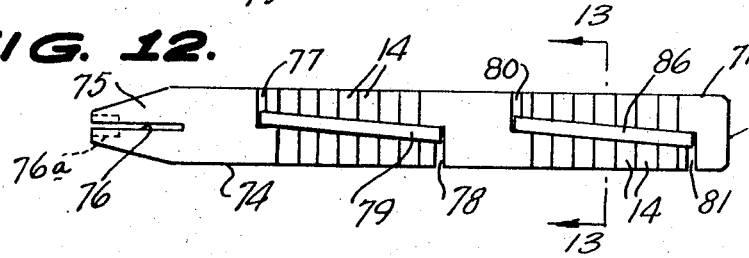
FIG. 13.
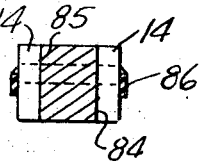
FIG. 14.
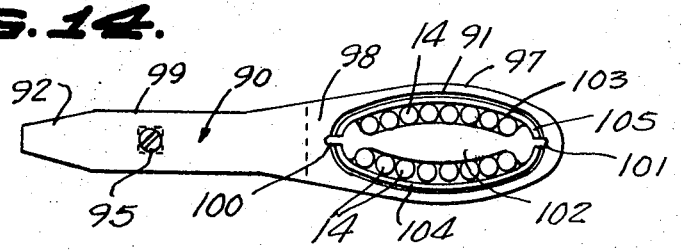
FIG. 15.    FIG. 16.
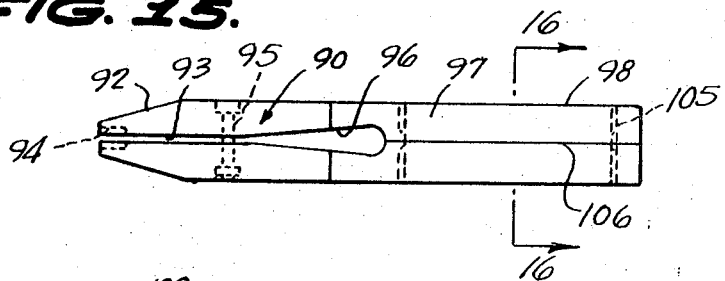 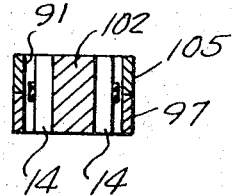
FIG. 17.
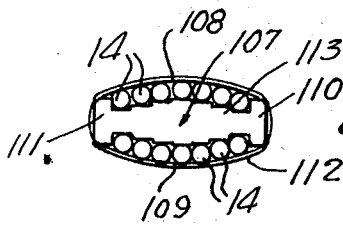
FIG. 18.
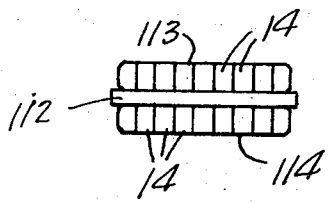
INVENTOR.
JOHN P. SHURCLIFF,
BY
Linton and Linton
ATTORNEYS.

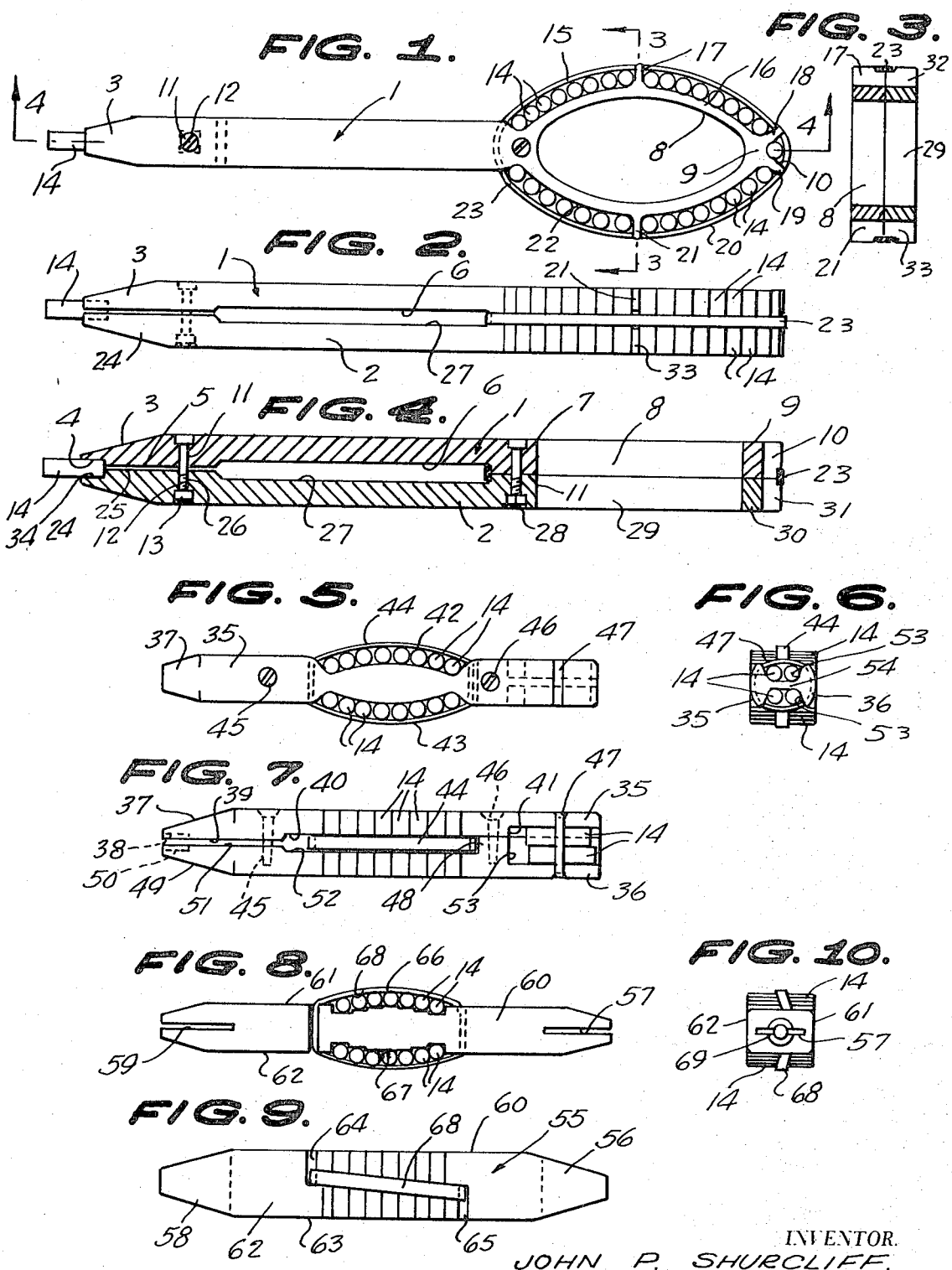

3,526,463
MARKING INSTRUMENT
John P. Shurcliff, Box 216, Tullahoma, Tenn. 37388
Filed Jan. 16, 1969, Ser. No. 791,591
Int. Cl. B43k 23/00, 23/02
U.S. Cl. 401—34                                 19 Claims

ABSTRACT OF THE DISCLOSURE

The present marking instruments have at least one storage area for a plurality of cylindrical marking elements with said marking elements detachably retained on the marking instrument or on a magazine detachably stored within the marking instrument and at least one end axial bore for detachably retaining a marking element partly therein for marking purpose, but which can be replaced by other marking elements as from said stored marking elements and can also be used to detach and replace one of said stored marking elements.

DESCRIPTION OF THE INVENTION

The present invention relates to marking instruments and is more particularly concerned with an instrument having a magazine for marking elements and at least one end capable of receiving and detachably retaining one of said marking elements.

The principal object of the invention is to provide manually held and used marking instruments which employ a detachable marking element at one or both ends thereof and a storage arrangement for a plurality of said marking elements whereby the marking elements can be quickly and readily interchanged between those in the storage arrangement and the marking element carried at the end or ends of the marking instrument.

A further and important object of the invention is to provide an economically produceable marking instrument which has an arrangement for carrying a plurality of marking elements in reserve which are visible at all times, can be readily pushed from the storage arrangement as desired for being attached or used at at least one end of the instrument whereby the instrument can be used for marking purposes and replaced or substituted for other marking elements in the storage arrangement.

Further objects of the invention will be in part pointed out and in part obvious from the following description of the accompanying drawing in which:

FIG. 1 is a top view of a marking instrument according to the present invention, FIG. 2 is a side view of the marking instrument, FIG. 3 is a cross-sectional view taken on line 3—3 of FIG. 1, FIG. 4 is a longitudinal sectional view taken on line 4—4 of FIG. 1, FIG. 5 is a top view of a modified form of the marking instrument, FIG. 6 is an end view taken from the right end of FIG. 5, FIG. 7 is a side view of the marking instrument of FIG. 5, FIG. 8 is a top view of the second modification of the marking instrument, FIG. 9 is a side view of the marking instrument of FIG. 8, FIG. 10 is an end view taken from the right end of FIG. 8, FIG. 11 is a top view of a third modification of the marking instrument, FIG. 12 is a side view of the marking instrument of FIG. 11, FIG. 13 is a cross-sectional view taken on line 13—13 of FIG. 12, FIG. 14 is a top view of a fourth modification of the marking instrument, FIG. 15 is a side view of the marking instrument of FIG. 14, FIG. 16 is a cross-sectional view taken on line 16—16 of FIG. 15, FIG. 17 is a top view of a modified form of magazine for the marking instrument of FIG. 14, and FIG. 18 is a side view of the magazine of FIG. 17.

Referring now more particularly to the accompanying drawings wherein like and corresponding parts are referred to by similar reference characters, numeral 1 generally indicates a longitudinal half section of a marking instrument having a slanting end 3 and semi-circular end recess 4 from which inwardly extends a flat bottom portion 5, a recess 6 and a flat bottom rear end portion 7. Said section 1 has an oval opening 8 surrounded by wall 9 with recess 10 in the end of said wall.

A lateral opening 11 in section 1 is for a bolt 12 extending therethrough with nut 13 in threaded engagement therewith.

Wall 9 has a side convex recess 15–16 separated by a fret 17 and has an end fret 18 separating recess 16 from recess 10. A plurality of cylindrical marking elements 14 are positioned in recess 15–16 and a single element 14 in recess 10. The opposite side of wall 9 has a fret 19 separating recess 10 from a second side convex recess 20–22 separated by fret 21. A further plurality of marking elements 14 are positioned in recess 20–21. All of said marking elements are retained against wall 9 by an elastic band 23 extending from recess 6 around the marking elements 14 and frets 17, 18, 19, and 21.

Each marking element 14 is of a cylindrical configuration and the term "marking element" is to include a lead, crayon, charcoal or other marking material.

A second longitudinal section 2 of the marking instrument is similar to section 1 and has a slanting end 24, flat bottom portion 25, lateral recess 26 for the threaded end of bolt 12 and nut 13, recess 27 and flat rear end bottom portion 28 with oval opening 29 surrounded by wall 30 similar to wall 9 and having end recess 31 and frets 32 and 33. Also end 24 has a semi-circular end recess 34 facing recess 4 for detachably retaining a marking element 14 therebetween.

Bottom 5, recess 6, bottom 7, wall 9 and frets 17, and 21 of section 1 face bottom 25, recess 27, bottom 28, wall 30, and frets 32 and 33, respectively of section 2 with bottoms 5 and 25 slightly spaced apart so that bolt 12 and nut 13 can be adjusted to enable recesses 4 and 34 to frictionally grip marking element 14 therebetween. Recesses 6 and 27 have one end of band 23 therein before bolt 11 is inserted in openings 12 and 26. Bottoms 7 and 28 can be held together by a suitable adhesive.

The marking instrument of FIGS. 5 through 7 has two matching half-sections 35 and 36 with section 35 having a slanting end 37 with semi-circular end recess 38 and flat bottom portion 39. Section 35 also has a bottom recess 40 and end recesses 41. The medial sides of sections 35 and 36 have contiguous curved recesses 42 and 43 with elastic band 44 retaining marking elements 14 against said section curved sides.

Screws 45 and 46 hold sections 35 and 36 together.

An elastic band 47 retains two pairs of marking elements 14 in the end recesses.

Section 36 has a slanting end 49, semi-circular end recess 50, flat bottom portion 51, bottom recess 52, shoulder 48, side recesses 53 separated by partition 54 which face recess 38, bottom portion 39, recess 40, recesses 41, respectively of section 35. Elastic band 44 extends through the opening provided by recesses 40 and 52. The pairs of marking elements are on each side of portion 54 in the recesses 41 and 53 with band 47 around the rear end portions of sections 35 and 36 and said pairs of marking elements.

The marking instrument of FIGS. 8 to 10 is generally indicated by numeral 55 and has truncated cone shaped ends 56 and 58 with slits 57 and 59, respectively in said ends. Said instrument has a flat top 60, flat sides 61 and 62 and flat bottom 63. A slot 64 extends inwardly from top 60 and between sides 61 and 62. A second slot 65 extends inwardly from bottom 63 and between sides 61 and 62. Said sides 61 and 62 between slots 64 and 65 have convex stepped recesses 66 and 67 respectively with marking elements 14 positioned each on one step of said recesses 66 and 67. A resilient band 68 has an end portion in each of said slots 64 and 65 and retains said marking elements against the recessed sides 61 and 62. Each end 56 and 58 also has a cylindrical axial recess 69.

The marking instrument 70 of FIGS. 11 to 13 has a flat top 71, flat sides 72 and 73 and flat bottom 74. End 75 is of a truncated cone configuration with transverse slit 76 and cylindrical axial end recess 76a.

A slot 77 extends from top 71 inwardly and between sides 72 and 73, while a second slot 78 extends inwardly from bottom 74 and between sides 72 and 73. Convex stepped recesses 82 and 83 are provided between slots 77 and 78 in sides 72 and 73, respectively with elastic band 79 extending through slots 77 and 78 and over marking elements 14 in recesses 82 and 83.

Slots 80 also extends inwardly from top 71 and between sides 72 and 73 while slot 81 extends inwardly from bottom 74 and between sides 72 and 73. Convex stepped recesses 84 and 85 are provided between slots 80 and 81 in sides 72 and 73 with resilient band 86 extending through slots 80 and 81 and around marking elements 14 each on a step 87 and 88 of said recesses 84 and 85, respectively. The rear end of the instrument is at 89.

The marking instrument 90 of FIGS. 14 to 16 has two similar half sections or may be of a single piece of material. End portion 92 is of a truncated cone configuration with cross slit 93 and cylindrical axial recess 94. A nut and connected bolt 95 are positioned through instrument 90 normal to slit 93 for adjusting the spacing of said slit. Slit 93 also gradually widens at 96 to give end 92 a resiliency on each side of slits 93 and 96. Said instrument has an oval wall 97 at rear end portion 98 beyond neck 99 providing the portion to be manually held in the use of the instrument.

Wall 97 defines an oval opening 91 for magazine 102 of oval shape. Said magazine has convex side recesses 103 and 104 in which are positioned marking elements 14. Frets 100 and 101 extend from the sides of said magazine and a resilient band 105 surrounds said magazine side over frets 100 and 101 and elements 14 and said magazine is detachably positioned in opening 91 with frets 100 and 101 frictionally engaging wall 97. If said instrument is of two similar half sections they have a common rear flat bottom portion 106 which can be held together by adhesive therebetween or other conventional connecting means.

The magazine 107 of FIGS. 17 and 18 can be substituted in the marking instrument 90 for magazine 102 by sliding magazine 102 from opening 91 and inserting magazine 107. Said magazine 107 is of an oval configuration with convex stepped side recesses 108 and 109 with a marking element 14 on each step thereof. Ends 110 and 111 of magazine 107 have recesses 108 and 109 therebetween and a resilient band 112 extends around ends 110 and 111 and over marking elements 14.

The diameter of the recesses 15–16, 20–22, 42, 43, 66, 67, 82, 83, 84, 85, 103, 104, 108, and 109 is determined in relation to the diameter of the marking elements 14 used at about 17 to 1, so that the surface is not too flat to hold the marking elements adequately, or too sharp, so that it is difficult to slide a marking element 14 under the resilient band even next to a fret, should there be no other adjacent marking element.

Each fret 17, 18, 19, 21, 100, and 101 has an end groove to confine their corresponding resilient band centrally therein and the span between frets is of a length so that the resilient band will not be pushed precariously to one side at center-span, while inserting a marking element.

In the use of the marking element of FIGS. 1 to 4, bolt 11 is rotated to adjust the spacing of slits 5 and 25 to fit the marking element 14 to be used so that marking elements of various diameters can be used for marking purposes by manually grasping the medial portion between end 3 and wall 9. The same applies to the bolt 95 of FIGS. 14 to 16.

In all of the marking instruments, a marking element 14 can be slipped longitudinally from beneath its retaining resilient band on the marking instrument by pushing thereon with another marking element, peg or the like. The loose marking element is then inserted in one of the end axial recesses of the marking instrument and the marking instrument manually held for marking purposes. Magazine 102 can be slipped from within opening 91 and new magazine such, as for example, magazine 107 substituted in opening 91. Said marking elements 14 may be of different colors or materials.

The present marking instruments are capable of considerable modification and such changes thereto as come within the scope of the appended claims is deemed to be a part of the present invention.

I claim:

1. A marking instrument comprising a marking instrument body, marking elements, means for detachably mounting at least one of said marking elements on said body in a position for use for marking purposes, said body having at least one curved surface with a plurality of said marking elements positioned thereon and at least one resilient band extending across said plurality of marking elements detachably retaining the same on said curved surface.

2. A marking instrument as claimed in claim 1, wherein said body has an oval end portion with convex recesses providing said curved surface.

3. A marking instrument as claimed in claim 2, wherein frets extend from said oval end recesses with said resilient band extending across said frets.

4. A marking instrument as claimed in claim 2, wherein said body has a longitudinal recess in the opposite end portion thereof, said resilient band extends through said longitudinal recess and around said oval end portion, adjustable means extends through said body opposite end portion for varying the width of said longitudinal recess and said means for detachably mounting at least one of said marking elements consists of a recess in the end of said body opposite end contiguous with said longitudinal recess.

5. A marking instrument as claimed in claim 4, wherein said body consists of a pair of similar facing longitudinal body sections with said body oval end sections being attached together.

6. A marking instrument as claimed in claim 1, wherein said body curved surface is provided by at least one convex recess in a side of said body and said body has a slot extending therethrough opening on said curved surface and said resilient band extends through said slot and across the marking elements on said curved surface.

7. A marking instrument as claimed in claim 6, wherein said body consists of a pair of facing longitudinal sections, means attaching said section together.

8. A marking instrument as claimed in claim 7, wherein said sections are spaced apart at one end portion providing said longitudinal slot extending to an end of said body and said body has a recess in said body for receiving a marking element.

9. A marking instrument as claimed in claim 6, wherein said body has at least one side recess in an end portion thereof for storing marking elements and a further resilient band extends around said body end for retaining the marking elements in said end recess.

10. A marking instrument as claimed in claim 1, wherein said body has a top slot and a bottom slot, said body curved surface is provided by at least one convex recess in a side of said body between said slots and said resilient band extends through said slots and across said convex recess.

11. A marking instrument as claimed in claim 10, wherein said marking element supporting means consists of a slot in an end of said body and a recess in said body contiguous with said slot.

12. A marking instrument as claimed in claim 10, wherein said convex recess has a stepped configuration.

13. A marking instrument as claimed in claim 1, wherein said body has a plurality of side slots with each slot of each pair of slots being on an opposite side of said body to the other slot of said pair, said curved surface being provided by convex recesses in said body each between a pair of said slots, and resilient bands each extending through a pair of said slots and across one of said convex recesses.

14. A marking instrument as claimed in claim 13, wherein said body convex recesses have a stepped configuration.

15. A marking instrument as claimed in claim 1, wherein said body has an opening in one end portion thereof, a magazine is slideably positioned in said body opening and has a curved side providing said curved surface with said plurality of marking elements thereon, and said resilient band extends around said magazine and said plurality of marking elements.

16. A marking instrument as claimed in claim 15, wherein a plurality of frets extend from said magazine curved side and has end recesses with said resilient band extending through said fret end recesses.

17. A marking instrument as claimed in claim 15, wherein said body has a slot across the other end portion thereof and a recess in the end of said other end portion providing said means for detachably mounting at least one of said marking elements, and means for adjusting the spacing of said slot and recess for retaining various sized marking elements.

18. A marking instrument as claimed in claim 15, wherein said magazine curved side has a series of steps along the length thereof.

19. A marking instrument as claimed in claim 17, wherein said body consists of two similar longitudinal facing sections with said one end portion of said sections being attached to one another and said other end portion of said section being spaced apart providing said slot.

References Cited

UNITED STATES PATENTS

| | | | |
|---|---|---|---|
| 499,191 | 6/1893 | Fornander | 401—57 X |
| 692,440 | 2/1902 | Goldsmith | 401—57 X |
| 2,902,977 | 9/1959 | Shurcliff | 401—34 |
| 3,119,376 | 1/1964 | Shurcliff | 401—89 |

FOREIGN PATENTS

| | | |
|---|---|---|
| 1,501,056 | 10/1967 | France. |
| 9,771 | 3/1901 | Great Britain. |

LAWRENCE CHARLES, Primary Examiner

U.S. Cl. X.R.

401—89